Dec. 23, 1930.　　F. E. BAUERMEISTER　　1,786,186
STEERING SHAFT LOCK
Filed April 19, 1928

Inventor
FRED E. BAUERMEISTER
his Attorneys

Patented Dec. 23, 1930

1,786,186

UNITED STATES PATENT OFFICE

FRED E. BAUERMEISTER, OF COLUMBUS, OHIO

STEERING-SHAFT LOCK

Application filed April 19, 1928. Serial No. 271,325.

The object of this invention is to provide an improved and simplified means for locking an automobile steering shaft whereby the time required to destroy and release the locking parts shall be so great as to deter an attempt unlawfully to appropriate the vehicle, such means also adapted when in locking position to keep the ignition circuit open.

Other objects will appear from the following disclosure.

The invention is embodied in the example herein shown and described, the features of novelty being finally claimed.

In the accompanying drawing—

Figure 1:
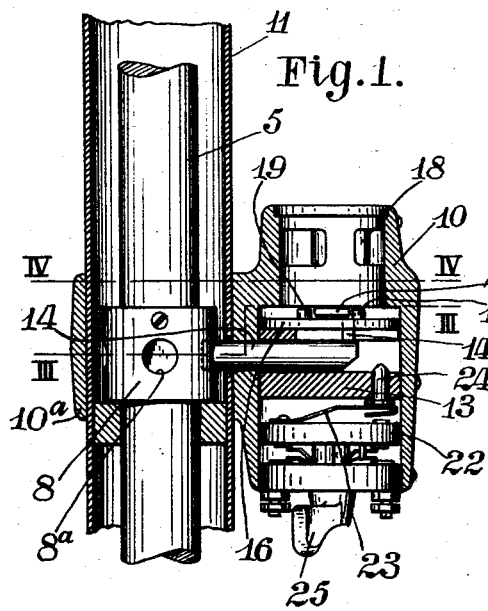
Figure 1 is mainly a central sectional view on the axis of the steering shaft, operating parts being in full.
Figure 3:
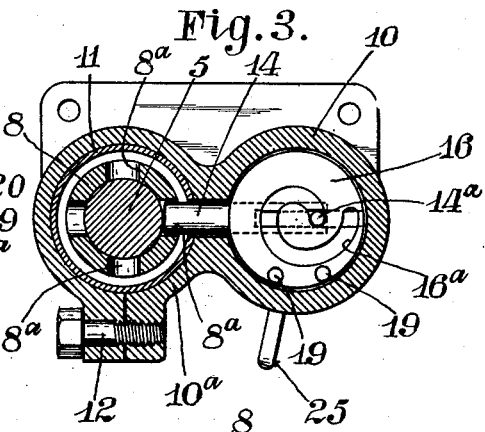
Fig. 3 are transverse sections on the bent line III—III Fig. 1.
Figure 2:
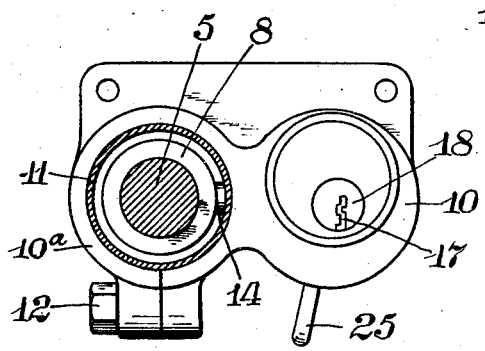
Fig. 2 is mainly a top plan view of Fig. 1.

In the views 5 designates the steering shaft to the upper end of which the steering wheel (not shown) is applied, as usual. Said steering shaft has secured to it by a set screw or otherwise a collar 8 provided with holes or sockets $8^a$ equidistantly located around it, each adapted to receive the inner end of the locking bolt 14 so that said shaft can be locked from rotation when the front wheels of the vehicle are headed straight ahead or to the right or to the left according to the socket engaged. The post is provided with a single bolt hole conforming to and located in the plane of the holes in the collar.

The case or housing for the lock is designated 10, it having an offset split circular clamp $10^a$ to fit around the steering post 11 and a bolt 12 inserted through suitable ears to bind said clamp to the steering post. The lock 18 employed is of the ordinary barrel or pin variety and is secured eccentrically in a boring in the upper end of the housing.

Figure 5:
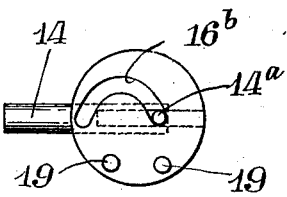
Fig. 5 illustrates a modified form of cam slot.

The lock housing 10 is provided below the lock with a suitable block or seat 13 provided with a hole in which slides the bolt 14, said bolt having a pin $14^a$ that travels in a guiding slot in the block above the bolt. Loosely resting on the block 13 above the bolt is a disk 16 having a volute slot $16^a$, said slot to receive the pin $14^a$, and said slot being so formed that when the disk 16 is turned the bolt is thrown either inward or outward according to the direction the disk is turned. I prefer that the volute slot $16^a$ shall be of such length that one complete rotation of the disk shall be required to throw the bolt completely in or completely out. With such a slot and with the housing fitting neatly around the post a complete rotation of the disk is required to disengage the bolt from a socket in the collar 8. With such a slot movement of the bolt from any of its positions is resisted except by the application of sufficient turning force. The length of the slot $16^a$ instead of requiring a 360 degree movement can be such as to require only a 180 degree movement as illustrated at $16^b$ in Fig. 5 according to the form of pin lock used. In the first form the insertion and removal of the operating key into the key hole at 17 is permitted upon a complete rotation of the key while in the second the key is insertable and removable from such hole upon a half rotation thereof.

Figure 4:
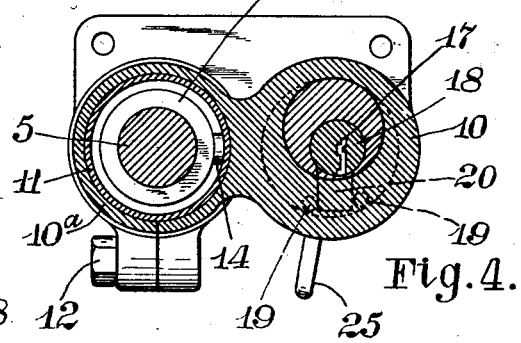
Fig. 4 is a transverse section on the line IV—IV Fig. 1.

The cam disk 16 is provided with two upwardly projecting pins 19 between which projects a lateral finger 20 of the lock member 18 so that when that member is freed for rotation by the use of the appropriate key said finger 20 may be swung to rotate the cam disk and therefore move the bolt 14 inward and outward with reference to a socket in the collar 8 to lock the steering shaft from rotation. When the bolt 14 is thrown inward to engage one of said sockets the steering shaft cannot be turned to steer the vehicle, nor can the pin lock be removed because the lateral finger 20 projects under the shoulder of the housing as shown in broken lines Fig. 4.

The housing below the bolt seat is provided with an insulating disk 22 on which is secured an electric circuit closing spring 23, the free end of which supports a pin 24 of nonconducting material, said pin extending through a hole in the locking bolt seat and adapted to be depressed when said bolt is thrown to unlock the steering shaft and therefore close the firing circuit at that point of the circuit. The mechanism of the switch including the switch lever 25, is also conveniently, as shown, located in the lower end of the housing. It will be observed that the switch is ineffective when the steering shaft is locked. It will also be observed that the lock is adapted to any form of steering post irrespective of the steering wheel.

The lock housing and bolt if made of good steel, renders access to the confined members so difficult that even with the most effective tools and with highly skillful and quick work it cannot be done in the period of time fixed by the insurance underwriters as being the minimum required to justify its approval for insurance purposes.

The forms of the parts can be changed without departing from the gist of the invention as claimed.

What I claim is:

1. Means for locking a steering shaft contained within the steering post of a motor vehicle comprising a lock case, a locking mechanism therein including a key thrown bolt, a block provided with a transverse perforation supporting the bolt, said bolt adapted to engage the steering post at its inner end to lock the same, means for clamping said case to the steering post, a firing circuit for said motor vehicle extending into said case, said circuit including a circuit closing spring carrying a pin, the latter extending through the perforation of the block to be directly actuated by the outer end of the bolt to move said spring to circuit closing position when the bolt is thrown from locking position.

2. Means for locking the steering shaft contained within the steering post of a motor vehicle comprising a lock case, a locking mechanism therein including a key thrown bolt, said bolt adapted to engage the steering post at its inner end to lock the same, means for clamping said case to the steering post, a firing circuit for said motor vehicle extending into said case, said circuit including a circuit closing spring carrying a pin located to be actuated by the outer end of the bolt to move said spring to circuit closing position when the bolt is thrown from locking position, and a supplemental manually operable circuit opening and closing device in said housing effective to close the firing circuit only when said steering shaft is unlocked.

FRED E. BAUERMEISTER.